United States Patent
Katou

(10) Patent No.: US 9,529,247 B2
(45) Date of Patent: Dec. 27, 2016

(54) PROJECTOR INCLUDING POLARIZATION SEPARATION ELEMENT AND ROTATING PRISM

(71) Applicant: NEC Display Solutions, Ltd., Tokyo (JP)

(72) Inventor: Atsushi Katou, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 0 days.

(21) Appl. No.: 14/436,880

(22) PCT Filed: Oct. 22, 2012

(86) PCT No.: PCT/JP2012/077183
§ 371 (c)(1),
(2) Date: Apr. 18, 2015

(87) PCT Pub. No.: WO2014/064743
PCT Pub. Date: May 1, 2014

(65) Prior Publication Data
US 2015/0286127 A1  Oct. 8, 2015

(51) Int. Cl.
*G03B 35/22* (2006.01)
*G02B 27/26* (2006.01)
(Continued)

(52) U.S. Cl.
CPC ............ *G03B 35/22* (2013.01); *G02B 26/008* (2013.01); *G02B 26/0883* (2013.01);
(Continued)

(58) Field of Classification Search
CPC ..... G02B 27/26; G03B 35/26; H04N 13/0422; H04N 13/0459
See application file for complete search history.

(56) References Cited

U.S. PATENT DOCUMENTS 5,986,815 A * 11/1999 Bryars ................ G02B 27/145
348/E9.027
6,739,723 B1 * 5/2004 Haven .................... H04N 9/315
348/790
(Continued)

FOREIGN PATENT DOCUMENTS

JP  2004-205919 A  7/2004
JP  2006-208955 A  8/2006
(Continued)

OTHER PUBLICATIONS

International Search Report (ISR) (PCT Form PCT/ISA/210), in PCT/JP2012/077183, dated Dec. 4, 2012.

*Primary Examiner* — Sultan Chowdhury
(74) *Attorney, Agent, or Firm* — McGinn IP Law Group, PLLC

(57) ABSTRACT

A projector including at least one light source, a polarization separation element that separates light from the light source into two linearly polarized light beams whose polarization axes are orthogonal to each other to emit the two linearly polarized light beams in the same direction, a TIR prism that transmits through the two linearly polarized light beams, a reflective light modulation element that receives the two linearly polarized light beams that have been emitted from the TIR prism to modulate and reflect the two linearly polarized light beams toward the TIR prism, a projection lens that enlarges and projects the two linearly polarized light beams that have been modulated by the reflective light modulation element and that have been transmitted through the TIR prism, and a rotating prism being rotatably arranged in an optical path.

8 Claims, 4 Drawing Sheets

(51) Int. Cl.
  *G02B 26/08* (2006.01)
  *G03B 21/20* (2006.01)
  *G03B 35/26* (2006.01)
  *H04N 13/04* (2006.01)
  *G02B 26/00* (2006.01)
  *G03B 21/00* (2006.01)

(52) U.S. Cl.
  CPC ........... *G02B 27/26* (2013.01); *G03B 21/008* (2013.01); *G03B 21/2013* (2013.01); *G03B 21/2066* (2013.01); *G03B 21/2073* (2013.01); *G03B 35/26* (2013.01); *H04N 13/0422* (2013.01); *H04N 13/0427* (2013.01); *H04N 13/0434* (2013.01); *H04N 13/0443* (2013.01); *H04N 13/0459* (2013.01)

(56) References Cited

U.S. PATENT DOCUMENTS

| | | | | |
|---|---|---|---|---|
| 2003/0038923 | A1* | 2/2003 | Aastuen | G02B 27/1026 353/31 |
| 2005/0174641 | A1* | 8/2005 | Greenberg | G02B 27/283 359/487.03 |
| 2005/0286021 | A1* | 12/2005 | Park | H04N 9/315 353/20 |
| 2006/0164606 | A1* | 7/2006 | Bhowmik | G03B 21/20 353/84 |
| 2009/0190101 | A1* | 7/2009 | Alasaarela | G02B 5/04 353/81 |

FOREIGN PATENT DOCUMENTS

| | | |
|---|---|---|
| JP | 2009-042316 A | 2/2009 |
| WO | WO 2011/108077 A1 | 9/2011 |

\* cited by examiner

PROJECTOR INCLUDING POLARIZATION SEPARATION ELEMENT AND ROTATING PRISM

TECHNICAL FIELD

The present invention relates to a projector, and more particularly to a projector that uses a DMD (Digital Micromirror Device).

BACKGROUND ART

A technology for realizing three-dimensional display images by means of a projector that is capable of large-screen display has been developed and put to practical use. In three-dimensional image display by means of a projector, a parallax-based method is typically used in which a left-eye image and a right-eye image are projected onto a screen and the viewer views the left-eye image with his or her left eye and the right-eye image with his or her right eye.

In this method, the viewer must select the image corresponding to each eye. For that purpose, a polarization projector is known that uses polarized glasses to cause the viewer to select the image corresponding to each eye.

In the polarization projector, a left-eye image and a right-eye image that include parallax information are simultaneously displayed or are continuously and alternately displayed for each time-series frame on a screen such that the two images have different polarization state.

By viewing the displayed left-eye and right-eye images that have different polarization states through polarized glasses that have polarization selectivity, the viewer can visually sense the displayed images as a three-dimensional image because the two images are respectively and selectively observed with the corresponding eyes.

As a method of simultaneously displaying on a screen a left-eye image and a right-eye image having different polarization states, a method has been proposed that uses two projectors such that the left-eye image is displayed by the first projector and the right-eye image is displayed by the second projector. In this display method, in order to eliminate the inconvenience of providing two projectors that emit two types of projection light having different polarization states, two projectors are used that emit two types of projection light having the same polarization state, and a polarization switching element comprising a reflecting mirror is used to change the polarization state of the projection light from one projector, whereby the left-eye and right-eye images having different polarization states are generated by the two projectors.

In this method that uses two projectors, a problem occurs in which it is difficult both to match display image characteristics, such as brightness and color shade, of the two projectors and to adjust the projection positions of the two projectors. The use of two projectors also raises problems regarding miniaturization of the system and ease of use.

In this respect, Patent Literature 1 discloses a configuration in which a single projector is capable of displaying a left-eye image and a right-eye image. In this projector, a color wheel separates white light from a light source into red (R), green (G), and blue (B) in time division, and then a reflective polarizer separates the light into orthogonal linearly polarized light beams (P-polarization component and S-polarization component). The separated linearly polarized light beams are applied to different DMDs (Digital Micromirror Devices) as reflective light modulation elements to be modulated. The modulated linearly polarized light beams are synthesized by a polarization beam splitter and then enlarged and displayed by a single projection lens. This projector enables three-dimensional display by assigning the left-eye image and right-eye image to the two DMDs.

CITATION LIST

Patent Literature

Patent Literature 1: JP 2004-205919 A

SUMMARY OF INVENTION

Technical Problem

The configuration disclosed in Patent Literature 1 provides the advantage of allowing the single projector to display the two images. However, since the two polarized light beams pass through different optical path, this configuration also entails the disadvantage of requiring two expensive DMDs which causes a cost increase. In addition, due to the fact that the two polarized light beams pass through the different optical paths, the reflective polarizer for performing polarization separation as well as the polarization beam splitter for synthesizing the polarized light beams are also required, which results in increasing the optical system's complexity and increasing the size of the projector itself. In addition, the polarization beam splitter for synthesizing the polarized light beams is positioned between the projection lens and the DMDs, thereby increasing the back focus of the projection lens (a distance between the projection lens and DMD), which leads to an increase in the size of the projection lens. These issues result in the problems of the increased size and higher cost of the overall optical system.

It is an object of the present invention to provide a compact projector of simple construction that is capable of displaying three-dimensional images.

Solution to Problem

According to one aspect of the present invention, a projector includes at least one light source, a polarization separation element that separates light from the light source into two linearly polarized light beams whose polarization axes are orthogonal to each other to emit the two linearly polarized light beams in the same direction, a TIR prism that transmits the two linearly polarized light beams, a reflective light modulation element that receives the two linearly polarized light beams that have been emitted from the TIR prism to modulate and reflect the two linearly polarized light beams toward the TIR prism, a projection lens that enlarges and projects the two linearly polarized light beams that have been modulated by the reflective light modulation element and that have been transmitted through the TIR prism, and a rotating prism being rotatably arranged in an optical path between the polarization separation element and the TIR prism to emit the two linearly polarized light beams that have entered from the polarization separation element from different positions depending on the rotation of the rotating prism.

According to another aspect of the present invention, a projector includes a plurality of light sources, a plurality of polarization separation elements, each of which is provided corresponding to each of the light sources, that separate light from the light sources into two linearly polarized light beams whose polarization axes are orthogonal to each other to emit the two linearly polarized light beams in the same direction, a reflective element, which is provided corresponding to at least one of the plurality of light sources, that reflects the two linearly polarized light beams, that have been emitted from the corresponding light source and that have been separated by the polarization separation element, to change a travel direction of the two linearly polarized light beams, a TIR prism that transmits the two linearly polarized light beams, a separation prism that separates the two linearly polarized light beams that have been emitted from the TIR prism into sets of the two linearly polarized light beams that correspond to the light sources and emits the sets of the two linearly polarized light beams, a plurality of reflective light modulation elements, each of which is provided corresponding to each of the light sources, that receive the two linearly polarized light beams that have been emitted from the separation prism to modulate and reflect the linearly polarized light beams toward the separation prism, a projection lens that enlarges and projects the two linearly polarized light beams that have been modulated by the reflective light modulation element, synthesized by the separation prism, and transmitted through the TIR prism, and a rotating prism being rotatably arranged in an optical path between the reflective element and the TIR prism to emit the two linearly polarized light beams that have entered from the reflective element from different positions depending on the rotation of the rotating prism.

DESCRIPTION OF EMBODIMENTS

Next, embodiments of the present invention will be described with reference to the drawings.

First Embodiment

Figure 1:
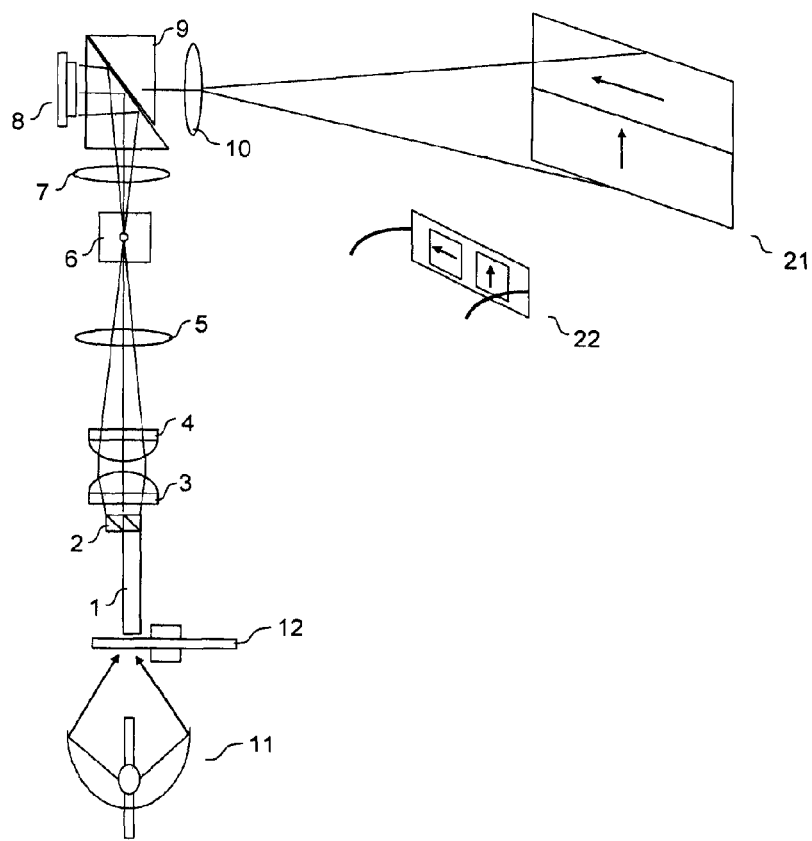
FIG. 1 is a schematic structural view of a first embodiment of a projector of the present invention.

FIG. 1 is a schematic structural view of a projector according to an embodiment of the present invention. The projector of the present invention includes light source 11, color wheel 12, rod integrator 1, polarization beam splitter 2, lenses 3, 4, 5 and 7, rotating prism 6, TIR (Total Internal Reflection) prism 9, DMD (Digital Micromirror Device) 8, and projection lens 10.

In this embodiment, an incandescent discharge lamp, e.g. a UHP (Ultra High Pressure) lamp that is characterized by high luminance and a short arc length, is used as light source 11. In terms of polarization, light from light source 11 may be unpolarized light. In addition to a discharge lamp, a light-emitting diode can be used. Alternatively, a fluorescence that is emitted from a phosphor by irradiation with laser light as excitation light can also be used.

Color wheel 12 is a component that separates white light into individual colors (blue, red and green) in time division.

Rod integrator 1 is a typically prism-shaped optical component composed of a material such as optical glass or optical resin. In most cases, a rod integrator is used in which an entrance surface and an exit surface have the same shape. In rare cases, a rod integrator is used in which an entrance surface and an exit surface have different sizes. In the present invention, either form can be used.

Polarization beam splitter 2 (polarization separation element) is capable of separating unpolarized light into two linearly polarized light beams whose polarization axes are orthogonal to each other by means of a dielectric multilayered film. For example, when entering at an angle of incidence of 45°, P-polarized light travels in a straight line and S-polarized light is separated at a right angle, and by causing the separated S-polarized light to be reflected in the same direction as the P-polarized light, the P-polarized light and the S-polarized light can be caused to travel separately in the same direction. In the present invention, a construction is used in which an exit surface of rod integrator 1 and polarization beam splitter 2 are optically bonded together. However, the two components do not have to be bonded and may be arranged to define an air gap therebetween.

Lenses 3, 4, 5 and 7 are lenses whose focal length, shape, and material are selected according to predetermined specifications. The four-part arrangement shown in FIG. 1 does not imply that four lenses are optimal, and the arrangement of lenses can be changed as appropriate according to product specifications of the projector.

TIR prism 9 is widely used in single-panel projectors that use DMD 8. In the present invention, TIR prism 9 both guides light from polarization beam splitter 2 to DMD 8 and guides light that have been modulated by DMD 8 to projection lens 10. In this case, light from polarization beam splitter 2 may first be subjected to total reflection and then guided to DMD 8, or may be guided to DMD 8 without being subjected to total reflection.

DMD 8 is a reflective light modulation element, includes a multiplicity of micromirrors that correspond to picture elements, and by individually changing the direction of each micromirror according to an image to be displayed, modulates light to form the image. The response speed of DMD 8 is extremely fast.

Rotating prism 6 is, for example, a prism-shaped optical component composed of optical glass or optical resin in which a section of the prism is square, and can be rotated by a rotary motor around an axis of rotation whose direction is perpendicular to the incident light. In addition, the direction of the axis of rotation is a direction orthogonal to the optical axis of the incident light.

Next, the travel of light in the projector of the present invention will be described.

Light that is emitted from light source 11 is separated into red, blue and green in time division by color wheel 12 and then enters rod integrator 1. This light is unpolarized light. The unpolarized light that enters rod integrator 1 is repeatedly reflected inside rod integrator 1, rendering its intensity distribution uniform, and then the light reaches an exit end surface of rod integrator 1. Since the exit surface of rod integrator 1 and polarization beam splitter 2 are joined, the unpolarized light of uniform intensity that has reached a polarization separation surface, which is composed of the dielectric multilayered film, of polarization beam splitter 2 is separated into P-polarized light and S-polarized light that are mutually orthogonal linearly polarized light beams, and then the polarized light beams exit polarization beam splitter 2 in the same direction. Here, the shape of an exit surface of polarization beam splitter 2 is similar to the aspect ratio of DMD 8. In other words, the sum of the surface through which P-polarized light exits and the surface through which S-polarized light exits is similar to the aspect ratio of DMD 8. Accordingly, the shape of the entrance surface and the exit surface of rod integrator 1 is similar to the shape half of DMD 8. This is because the diameter of light beam doubles when polarization separation occurs at polarization beam splitter 2. On the exit surface of polarization beam splitter 2, light beam is formed to have a shape substantially similar to that of DMD 8 and to include P-polarized light that occupies half of the area of the exit surface and S-polarized light that occupies the other half. The focal lengths and materials of, as well as the space intervals between lenses 3, 4, 5 and 7 are determined such that this light beam is enlarged according to a predetermined power and forms an image on DMD 8. The predetermined power is at the ratio of the size of the exit surface of polarization beam splitter 2 and the effective display region of DMD 8 and is preferably determined such that the image formed on DMD 8 is slightly larger than DMD 8.

The light that exits polarization beam splitter 2 enters rotating prism 6 through lenses 3, 4 and 5. The P-polarized light and the S-polarized light that are transmitted through rotating prism 6 pass through lens 7 and are reflected at TIR prism 9 and applied to DMD 8. DMD 8 is irradiated with the square-shaped P-polarized light and the square-shaped S-polarized light such that the polarized light beams do not overlap each other.

Different image signals are sent to DMD 8 having regions that are illuminated by the P-polarized light and the S-polarized light. For example, DMD 8 is operated such that a right-eye image signal is controlled in synchronization with the application of the P-polarized light and a left-eye image signal is controlled in synchronization with the application of the S-polarized light. By synchronizing the operation of DMD 8 with the period when each polarized light is being applied, DMD 8 is controlled to output the left-eye image during the period when the P-polarized light is being applied to DMD 8 and to output the right-eye image during the period when the S-polarized light is being applied to DMD 8.

The light that is modulated and reflected by DMD 8 is transmitted through TIR prism 9 and is projected onto screen 21 from projection lens 10.

Next, rotating prism 6 will be described in detail with reference to FIGS. 2A to 2D. In the present invention, the rotation of rotating prism 6 changes the regions of DMD 8 to which the P-polarized light and the S-polarized light are applied. For ease of explanation, FIGS. 2A to 2D each show rotating prism 6, lenses 23 and 24, and image formation plane (corresponding to DMD 8 in the present invention) 25. According to the figures, light that exits the polarization beam splitter (not shown in the figures) enters rotating prism 6, and then, under the action of lenses 23 and 24, forms an image on image formation plane 25. In FIGS. 2A to 2D, P-polarized light is shown as an example. In addition, the right side of each figure shows how DMD 8 is irradiated with P-polarized light and S-polarized light.

Figure 2A:
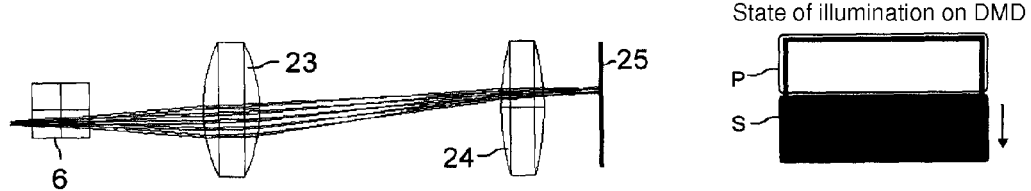
FIG. 2A is a schematic view for describing the action of a rotating prism.

When an entrance surface of rotating prism 6 is parallel to image formation plane 25, as shown in FIG. 2A, and when the incident light is P-polarized light, rotating prism 6 only acts as parallel plates placed perpendicular to this light beam. Thus, the P-polarized light reaches an upper half region of DMD 8.

Figure 2B:
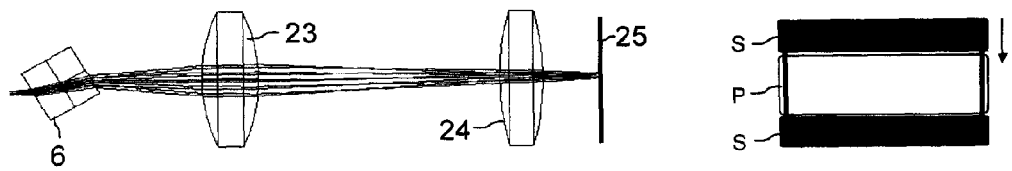
FIG. 2B is a schematic view for describing the action of the rotating prism.

FIG. 2B shows a state where rotating prism 6 is slightly rotated. P-polarized light that enters rotating prism 6 undergoes refraction, and then the light exits rotating prism 6 and reaches a central portion of DMD 8.

Figure 2C:
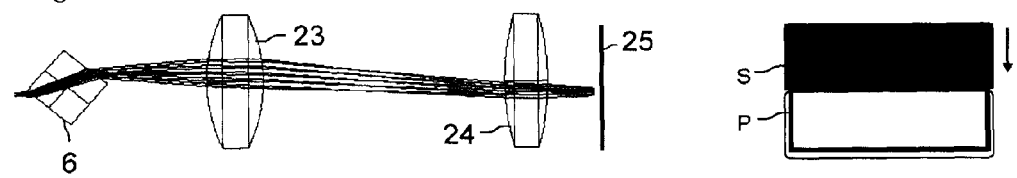
FIG. 2C is a schematic view for describing the action of the rotating prism.

FIG. 2C shows a state where rotating prism 8 is further rotated from the state of FIG. 2B. P-polarized light that enters rotating prism 6 undergoes refraction, and then the light exits the rotating prism and reaches a region corresponding to the lower half of DMD 8.

Figure 2D:
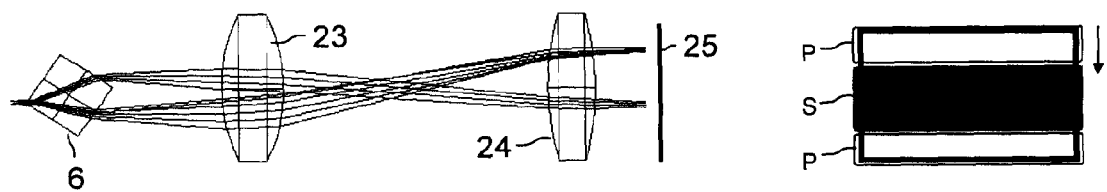
FIG. 2D is a schematic view for describing the action of the rotating prism.

FIG. 2D shows a state where the rotating prism is further rotated from the state of FIG. 2C. P-polarized light that enters rotating prism 6 undergoes refraction, and then the light exits the rotating prism and reaches an upper portion and a lower portion of DMD 8.

As can be understood from FIGS. 2A to 2D, the light that exits rotating prism 6 constantly changes its exit direction. As a result, the region of the DMD on which the P-polarized light forms the image is one-dimensionally moved according to the rotation of rotating prism 6, and therefore the P-polarized light can scroll over DMD 8 in the vertical direction. Although only the operation of P-polarized light has been described, the same applies to the operation of S-polarized light. Accordingly, the P-polarized light and the S-polarized light scroll up and down on the DMD, as shown on the right side of each of FIGS. 2A to 2D. The constant rotation of rotating prism 6 allows the P-polarized light and the S-polarized light to constantly scroll over DMD 8.

In the present invention, since the P-polarized light and the S-polarized light that are emitted from polarization beam splitter 2 follow the same optical path to reach DMD 8, DMD 8 is constantly irradiated with P-polarized light and S-polarized light that have substantially the same amount of light, as schematically shown on the right side of each of FIGS. 2A to 2D. In the present invention, the unpolarized light that is emitted from light source 11 is efficiently separated into the P-polarized light and the S-polarized light by means of polarization beam splitter 2 and applied to DMD 8 to act as illumination light, which causes the projector to have extremely high light use efficiency and low light loss.

In the present invention, rotating prism 6 allows the P-polarized light and the S-polarized light that are applied to DMD 8 to alternately scroll over DMD 8, whereby the right-eye image of P-polarized light and the left-eye image of S-polarized light are projected onto screen 21 while alternately scrolling. The right-eye image of P-polarized light and the left-eye image of S-polarized light are projected. As a result, by viewing the projected image on screen 21 through, for example, polarization glasses 22 having a right-eye lens that transmits only P-polarized light and a left-eye lens that transmits only S-polarized light, the viewer views the left-eye image with his or her left eye and the right-eye image with his or her right eye. Thus, the viewer can use parallax to see a three-dimensional image.

Figure 3A:
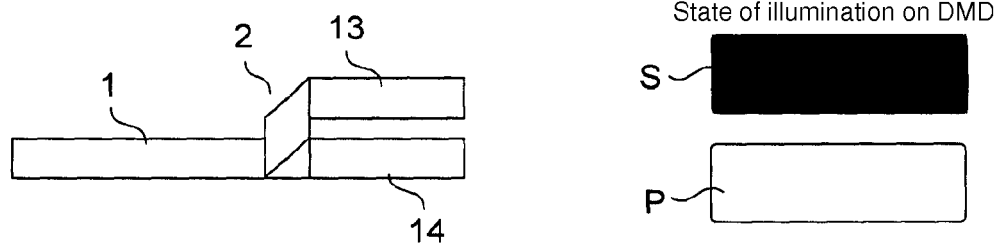
FIG. 3A is a schematic view of one example in which a second rod integrator is positioned immediately after a polarization beam splitter.
Figure 3B:
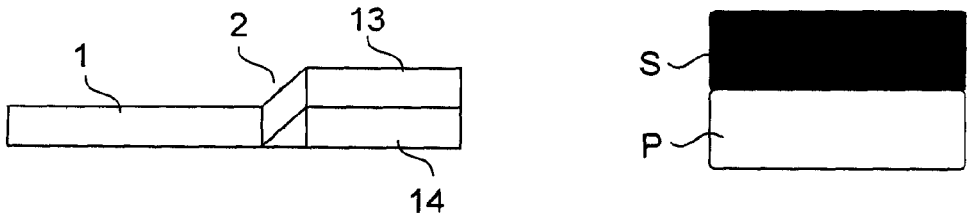
FIG. 3B is a schematic view of another example in which a second rod integrator is positioned immediately after a polarization beam splitter.

A case has been described in which light from light source 11 is separated into P-polarized light and S-polarized light by means of polarization beam splitter 2 that is positioned immediately after the exit surface of rod integrator 1, the entirety of the P-polarized light and the S-polarized light producing a single illumination light. However, additional rod integrators may be provided to be positioned immediately after polarization beam splitter 2, whereby the quality of light that is applied to DMD 8 can be improved. As shown in FIGS. 3A and 3B, second rod integrators 13 and 14 are arranged at positions where P-polarized light and S-polarized light exit polarization beam splitter 2 that is arranged at the exit surface of first rod integrator 1. In FIG. 3A, polarization beam splitter 2 is configured such that there is a gap between P-polarized light and S-polarized light that exit polarization beam splitter 2. The P-polarized light and the S-polarized light that exit polarization beam splitter 2 are adapted to enter additional rod integrators 13 and 14. In this configuration, second rod integrators 13 and 14 are spaced apart from each other. Furthermore, in this configuration, there is a gap between P-polarized light and S-polarized light on DMD 8, as shown on the right side of FIG. 3A. Preferably, however, there is no gap between the P-polarized light and the S-polarized light. Therefore, polarization beam splitter 2 is preferably configured such that there is no gap between the P-polarized light and the S-polarized light that exit polarization beam splitter 2, as shown in FIG. 3B, and second rod integrators 13 and 14 are preferably configured to be spaced apart from each other.

Second rod integrators 13 and 14 may have absolutely identical specifications. As a result of using second rod integrators 13 and 14, even if uneven luminance or uneven illuminance of light beam should occur in the exited P-polarized light and S-polarized light due to the occurrence of characteristic non-uniformity resulting from manufacturing error of the thin film (dielectric multilayered film) of the polarization separation surface of polarization beam splitter 2, the uneven luminance or uneven illuminance of the light beam can be improved because the polarized light beams respectively enter second rod integrators 13 and 14. Therefore, high-quality light beam, whose illuminance distribution is uniform with high accuracy in a cross-section of the light beam, can be obtained from light that has exited second rod integrators 13 and 14.

In the present invention, since the P-polarized light and the S-polarized light travel along the same optical path, the projector requires only one DMD and fewer components, thus enabling a simpler optical system. In addition, costs can be reduced and the size of the projector can be decreased. Further, when a solid-state light source is used as the light source, a projector capable of three-dimensional display can be provided that has a light source with longer life and lower power consumption. Still further, when a three-panel type reflective light modulation element is used instead of a single-panel type reflective light modulation element, a projector can be provided that is capable of three-dimensional display and that is brighter than a single-panel projector.

Second Embodiment

Figure 4:
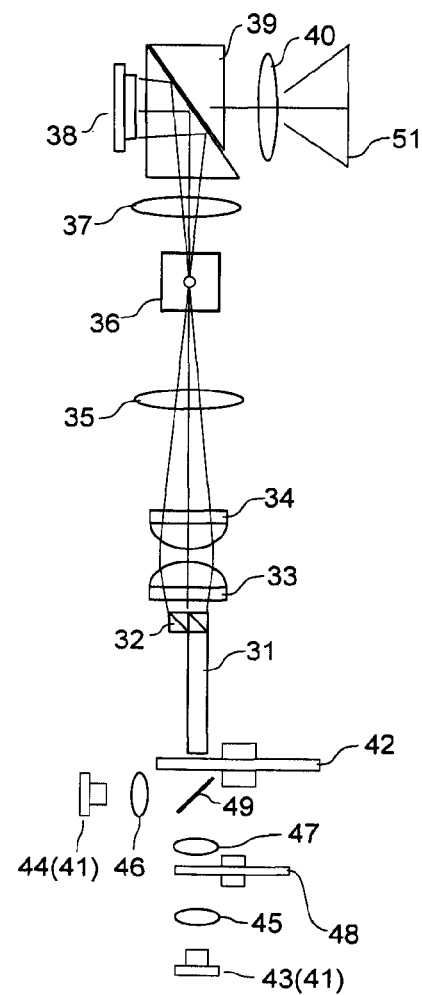
FIG. 4 is a schematic structural view of a second embodiment of the projector of the present invention.

A second embodiment of the projector according to the present invention will be described with reference to FIG. 4. In this embodiment, solid-state light sources such as light-emitting diodes or semiconductor lasers are used as light sources 41. In this embodiment, a configuration from color wheel 42 until screen 51 is similar to that in the first embodiment.

In this embodiment, two blue (B-color) semiconductor lasers 43 and 44 are used as light sources 41. A laser beam from B-color semiconductor laser 43 is condensed by condenser lens 45, and in the vicinity of the condensing point, rotating wheel 48 composed of a disk to which phosphors are affixed is arranged as a secondary light source of green (G-color), yellow (Y-color) or red (R-color) fluorescent light. In this secondary light source, light that is condensed by condenser lens 47 is transmitted through dichroic mirror 49, which is a reflecting element for reflecting the B-color and transmitting the other colors, and then transmitted through color wheel 42 to enter rod integrator 31. In addition, a laser beam that is emitted from another B-color semiconductor laser 44 is condensed by condenser lens 46, reflected by dichroic mirror 49, and enters rod integrator 31 through color wheel 42.

Color light among the fluorescent light that is produced by semiconductor laser 43 and rotating wheel 48 and the B-color that is generated in semiconductor laser 44 is selected in time division in synchronization with the operation of DMD 8. Components that are positioned after color wheel 42 are similar to those of the first embodiment, and description thereof will therefore be omitted.

In this embodiment, by using solid-state light sources as the light sources, a highly efficient projector having long life and low power consumption can be achieved.

Third Embodiment

Figure 5:
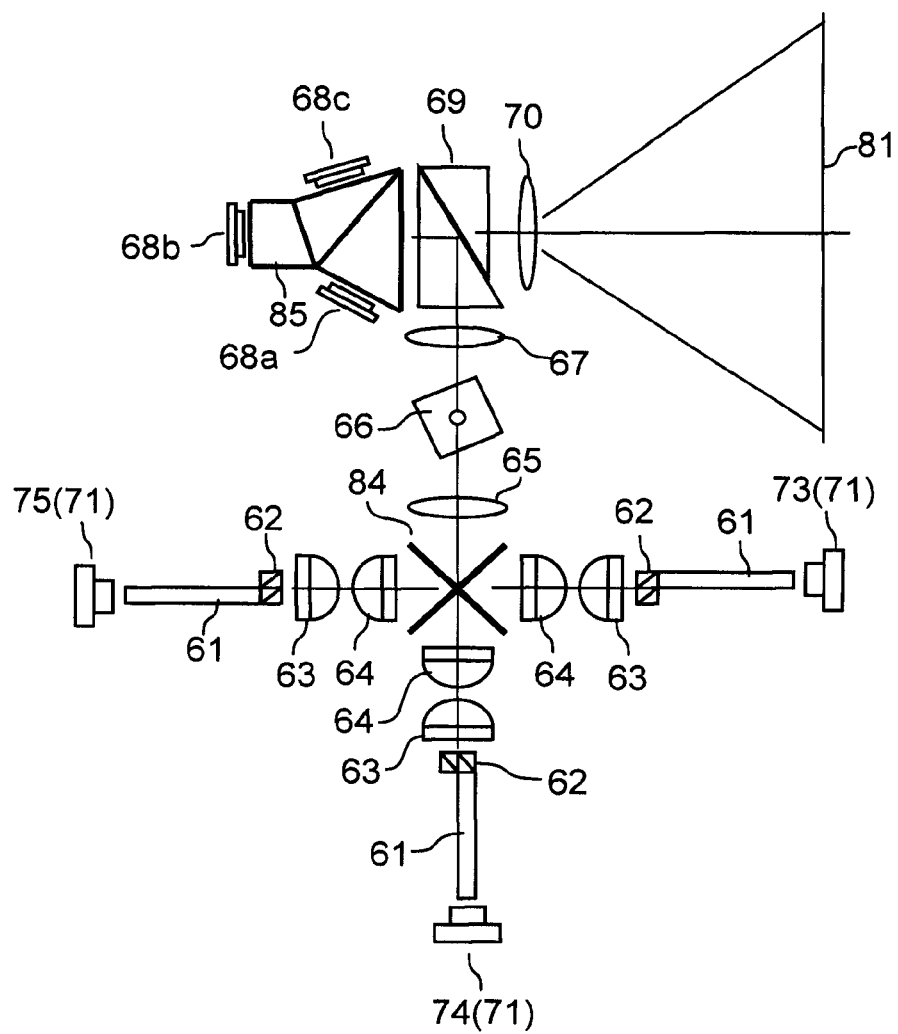
FIG. 5 is a schematic structural view of a third embodiment of the projector of the present invention.

A third embodiment of the projector according to the present invention will be described with reference to FIG. 5. In this embodiment, solid-state light sources are used as light sources 71, and a three-panel type reflective light modulation element is used instead of a single-panel type reflective light modulation element. The projector of this embodiment includes R-color solid-state light source 73, G-color solid-state light source 74, B-color solid-state light source 75, rod integrators 61, polarization beam splitters 62, lenses 63, 64, 65 and 67, rotating prism 66, cross-dichroic mirror 84, TIR prism 69, three-color separation prism 85, DMDs 68a, 68b and 68c, and projection lens 70.

Dichroic mirror 84 is configured to reflect R-color light and B-color light and to transmit G-color light. R-color solid-state light source 73 and B-color solid-state light source 75 face each other across dichroic mirror 84, and G-color solid-state light source 74 faces dichroic mirror 84 and is perpendicular to a line joining R-color solid-state light source 73 and B-color solid-state light source 75.

A light-emitting diode, a semiconductor laser, or fluorescence that is excited by these components can be used as each of solid-state light sources 73, 74, and 75. Light of each color exits rod integrator 61 and is then separated into P-polarized light and S-polarized light by means of polarization beam splitter 62. After passing through lenses 63 and 64, the R-color light and the B-color light are reflected by cross-shaped cross dichroic mirror 84, and the G-color light is transmitted through dichroic mirror 84, whereby the light of the three colors is synthesized to travel along a single optical path. The synthesized light passes through lens 65, rotating prism 66, and lens 67, is reflected at TIR prism 69, and is resolved into three colors at three-color separation prism 85. The R-color light, G-color light, and B-color light are applied to DMDs 68a, 68b and 68c, respectively, and are modulated and reflected by DMDs 68a, 68b and 68c, respectively. The light that has been reflected by DMDs 68a, 68b, and 68c is transmitted through TIR prism 69, and is enlarged and projected onto screen 81 by projection lens 70.

In this embodiment, light sources 73, 74 and 75 constantly emit light and constantly irradiate DMDs 68a, 68b, and 68c, respectively, and the projected image is therefore brighter than in a single-panel projector. In addition, by using solid-state light sources, a highly efficient projector having low power consumption can be achieved.

Although the preferred embodiments of the present invention have been presented and described in detail, the present invention is not limited to the above-described embodiments. It should be understood that various changes and modifications can be made therein without departing from the scope of the present invention.

REFERENCE SIGNS LIST 11, 41, 71 Light source
2, 32, 62 Polarization beam splitter (Polarization separation element)
6, 36, 66 Rotating prism
9, 39, 69 TIR prism
8, 38, 68a, 68b, 68c DMD (Reflective light modulation element)
10, 40, 70 Projection lens

The invention claimed is:

1. A projector, comprising:
   at least one light source;
   a polarization separation element that separates light from the light source into two linearly polarized light beams whose polarization axes are orthogonal to each other to emit the two linearly polarized light beams in the same direction;
   a total internal reflection (TIR) prism that transmits the two linearly polarized light beams;
   a reflective light modulation element that receives the two linearly polarized light beams that have been emitted from the TIR prism to modulate and reflect the two linearly polarized light beams toward the TIR prism;
   projection lens that enlarges and projects the two linearly polarized light beams that have been modulated by the reflective light modulation element and that have been transmitted through the TIR prism;
   a rotating prism being rotatably arranged in an optical path between the polarization separation element and the TIR prism to emit the two linearly polarized light beams that have entered from the polarization separation element from different positions depending on the rotation of the rotating prism;
   the at least one light source comprising two solid-state light sources that emit light of a first color;
   a rotating wheel including a disk to which a phosphor is affixed and that, due to light from one of the two solid-state light sources, emits light of a plurality of colors other than the first color;
   a reflective element that changes a travel direction of light from the other of the two solid-state light sources; and
   a color wheel that receives light from the rotating wheel and light from the reflective element to separate the received light into a plurality of colors in time division,
   wherein the polarization separation element receives light that has been emitted from the color wheel.

2. The projector as set forth in claim 1, wherein a rod integrator is arranged in an optical path between the light source and the polarization separation element to receive light from the light source and to reflect light at inner surfaces and emit light.

3. The projector as set forth in claim 1, wherein the two linearly polarized light beams that are emitted from the polarization separation element are adjacent to each other to form a single light beam.

4. The projector as set forth in claim 3, wherein a cross-section of the light beam that is formed when emitted from the polarization separation element is similar to an aspect ratio of the reflective light modulation element.

5. The projector as set forth in claim 1, wherein the rotating prism has a cube shape.

6. The projector as set forth in claim 1, wherein the reflective light modulation element comprises a DMD.

7. The projector as set forth in claim 1, further comprising a color wheel arranged in an optical path between the light source and the polarization separation element to separate the light from the light source into a plurality of colors in time division,
   wherein an incandescent discharge lamp is used as the light source.

8. A projector comprising:
   a plurality of light sources;
   a plurality of polarization separation elements, each of which is provided corresponding to each of the light sources, that separate light from the light sources into two linearly polarized light beams whose polarization axes are orthogonal to each other to emit the two linearly polarized light beams in the same direction;
   a reflective element, which is provided corresponding to at least one of the plurality of light sources, that reflects the two linearly polarized light beams, that have been emitted from the corresponding light source and that have been separated by the polarization separation element, to change a travel direction of the two linearly polarized light beams;
   a total internal reflection (TIR) prism that transmits the two linearly polarized light beams;
   a separation prism that separates the two linearly polarized light beams that have been emitted from the TIR prism into sets of the two linearly polarized light beams that correspond to the light sources and emits the sets of the two linearly polarized light beams;
   a plurality of reflective light modulation elements, each of which is provided corresponding to each of the light sources, that receive the two linearly polarized light beams that have been emitted from the separation prism to modulate and reflect the linearly polarized light beams toward the separation prism;
   a projection lens that enlarges and projects the two linearly polarized light beams that have been modulated by the reflective light modulation element, synthesized by the separation prism, and transmitted through the TIR prism;
   a rotating prism being rotatably arranged in an optical path between the reflective element and the TIR prism to emit the two linearly polarized light beams that have entered from the reflective element from different positions depending on the rotation of the rotating prism;
   the plurality of light sources comprising two solid-state light sources that emit light of a first color;
   a rotating wheel including a disk to which a phosphor is affixed and that, due to light from one of the two solid-state light sources, emits light of a plurality of colors other than the first color;
   a reflective element that changes a travel direction of light from the other of the two solid-state light sources; and
   a color wheel that receives light from the rotating wheel and light from the reflective element to separate the received light into a plurality of colors in time division,
   wherein the polarization separation element receives light that has been emitted from the color wheel.

* * * * *